United States Patent [19]
Hirawata

[11] Patent Number: 5,892,174
[45] Date of Patent: Apr. 6, 1999

[54] STRUCTURE CONSTRUCTED BY ULTRASONIC WELDING FOR ACCOMMODATING AN ELECTRIC APPARATUS

[75] Inventor: Seiichi Hirawata, Tokyo, Japan

[73] Assignee: Niles Parts Co., Ltd., Japan

[21] Appl. No.: 743,982

[22] Filed: Nov. 21, 1996

[30] Foreign Application Priority Data

Nov. 24, 1995 [JP] Japan .................................. 7-329673

[51] Int. Cl.$^6$ ...................................................... H01H 9/02
[52] U.S. Cl. ........................... 174/50; 174/50.51; 220/5.8
[58] Field of Search .............................. 174/48, 50, 50.5, 174/50.51; 220/3.8, 3.9, 804, 4.21; 156/73.1, 308.4

[56] References Cited

U.S. PATENT DOCUMENTS

| 4,433,793 | 2/1984 | Igemann ................................. 220/276 |
| 4,529,100 | 7/1985 | Ingemann ............................... 220/359 |
| 4,813,563 | 3/1989 | Ogden et al. ........................... 215/253 |
| 5,040,357 | 8/1991 | Ingemann ............................... 156/73.1 |
| 5,148,347 | 9/1992 | Cox et al. ............................... 361/272 |
| 5,199,593 | 4/1993 | Kita ........................................ 220/359 |
| 5,381,301 | 1/1995 | Hudis ................................... 361/275.2 |
| 5,555,989 | 9/1996 | Moran, Jr. .............................. 220/62 |

FOREIGN PATENT DOCUMENTS 56-104022  8/1981  Japan .

Primary Examiner—Nestor Ramirez
Assistant Examiner—Joseph Waks
Attorney, Agent, or Firm—Rader, Fishman & Grauer; Ronald P. Kananen

[57] ABSTRACT

A structure for accommodating an electric apparatus having contacts in an accommodating space formed by joining a welding protrusion of a first member and a joint portion of a second member by ultrasonic welding. A groove is formed between the joint portion and the accommodating space to gather and prevent welding refuse produced by the ultrasonic welding from penetrating into the accommodating structure and sticking to the contacts of the electric apparatus and to concentrate ultrasonic energy to the joint portion. An opening through which the welding refuse flows is also formed outside of the joint portion. The opening has an aperture that increases with increasing distance from the joint portion.

10 Claims, 3 Drawing Sheets

STRUCTURE CONSTRUCTED BY ULTRASONIC WELDING FOR ACCOMMODATING AN ELECTRIC APPARATUS

BACKGROUND OF THE INVENTION

1. Field of the Invention

The present invention relates to structures constructed by ultrasonic welding and, in particular, to an improvement in a structure constructed by ultrasonic welding for accommodating an electric apparatus having contacts, such as a relay or the like, which is hermetically sealed.

2. Description of the Prior Art

There are known prior art techniques for constructing a case for accommodating an electric apparatus or the like by ultrasonic welding. For example, Japanese Utility Model Publication No. A-Sho 56-104022 discloses such a technique.

However, these known techniques had problems in that when the accommodating case was constructed by ultrasonic welding, a part of the synthetic resin deposited on a joint portion, which did not contribute to welding, i.e., welding refuse, penetrated from the joint portion into the interior of the accommodating case. For this reason, there was a risk that the welding refuse was deposited, for example, on the contacts of the electric apparatus accommodated within the case, which caused a contact defect in the electric apparatus.

In addition, these known techniques had a problem in that if the welding refuse existed between different members forming the accommodating case, ultrasonic energy, which is desirably concentrated into the joint portion, was dispersed also on the welding refuse existing between the different members, which made the ultrasonic welding imperfect.

SUMMARY OF THE INVENTION

The present invention has been made in order to solve the problems associated with the prior art structures described above.

An object of the present invention is to prevent the welding refuse produced by ultrasonic welding from penetrating the joint portion into the interior of the accommodating case so that no welding refuse is deposited on the contacts of the electric apparatus accommodated in the case and to concentrate ultrasonic energy into the joint portion in order to eliminate energy loss.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, a structure for accommodating an electric apparatus is provided, in which an accommodating space for accommodating an electric apparatus having contacts is constructed by a plurality of members and a joint portion between the different members is formed by ultrasonic welding, wherein a groove for gathering welding refuse is formed in one of the members between the accommodating space and the joint portion, i.e., on the accommodating space side of the joint portion.

According to another aspect of the present invention, the structure constructed by ultrasonic welding includes an opening, through which welding refuse flows, disposed outside of the joint portion.

According to still another aspect of the present invention, the opening of the structure is wider with increasing distance from the joint portion.

BRIEF DESCRIPTION OF THE DRAWINGS

The present invention will become more clearly appreciated as the disclosure of the invention is made with reference to the accompanying drawings. In the drawings.

DESCRIPTION OF THE PREFERRED EMBODIMENTS

Figure 1:
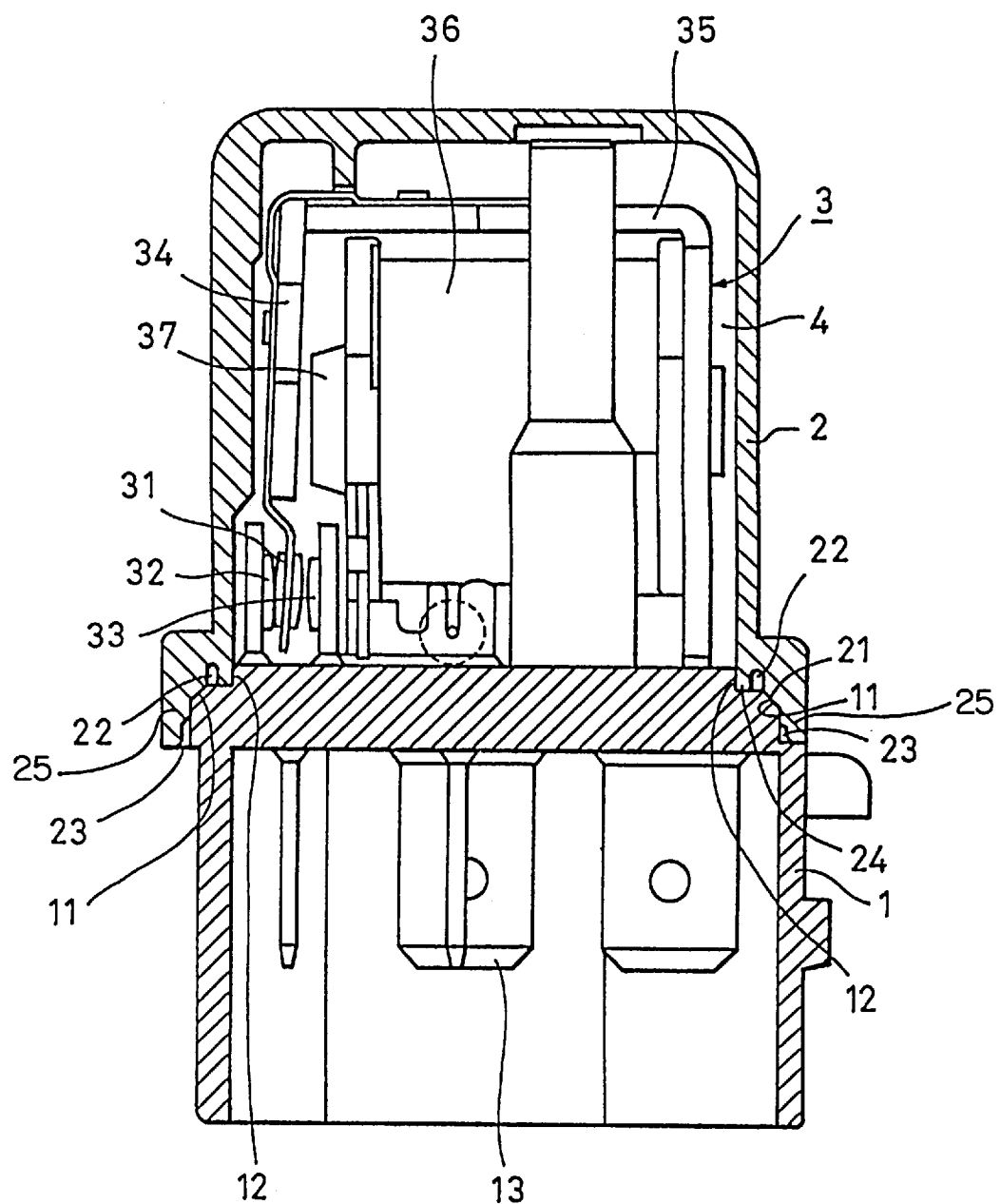
FIG. 1 is a cross-sectional view of a case accommodating an electric apparatus according to a preferred embodiment of the present invention.

A preferred embodiment of the present invention will now be described in detail with reference to FIGS. 1 to 4 of the accompanying drawings.

As shown in the drawings, a case accommodating an electric apparatus according to the present invention comprises a first member 1 and a second member 2, both of which are made of synthetic resin.

An electric apparatus 3 in the form of a relay, for example, is housed within the case. The electric apparatus 3 is provided with a movable contact 31, a contact normally closed 32, a contact normally open 33, an armature 34, a yoke 35, a coil 36, and a core 37, and has a function that, when an electric current flows through the coil 36, the core 37 attracts the armature 34 to switch the movable contact 31 from the contact normally closed 32 to the contact normally open 33.

The first member 1 is provided with a welding protrusion 11, a step 12, and terminals 13, and the electric apparatus 3 is mounted thereon. On the other hand, the second member 2 is provided with a welding joint portion 21, a groove 22, a flange portion 25 and an opening 23. These components will be explained in more detail below.

The welding protrusion 11 of the first member 1 is a ring-shaped portion having a rectangular cross-section so that ultrasonic waves applied through a horn 6 are easily concentrated thereon. The welding protrusion 11 is located so as to be opposite to the welding portion 21 of the second member 2. The step 12 of the first member 1 is a part supporting a lower end of the inner wall 24 of the second member 2. The step 12, together with the groove 22 of the second member 2, prevents the welding refuse 5 from penetrating into the accommodating space 4. The terminals 13 of the first member 1 provide an electrical connection between the electric apparatus 3 and an external circuit (not shown).

The welding portion 21 of the second member 2 is a part to which the welding protrusion 11 is welded. The surface of the welding portion 21 is inclined by about 45° with respect to the thrusting direction A of the horn 6. The groove 22 of the second member 2 functions to gather welding refuse 5 produced when the welding protrusion 11 is welded to the joint portion 21 by ultrasonic welding. The groove 22 is formed between the joint portion 21 and the accommodating space 4. The opening 23 in the second member 2 is disposed so that the welding refuse 5 flows therethrough to the side opposite the accommodating space 4, i.e., outward from the joint portion 21. The opening 23 is wider with increasing distance from the joint portion 21.

The first member 1 and the second member 2 form the accommodating space 4 having a waterproof structure by ultrasonic welding at the joint portion 21. The electric apparatus 3 is accommodated in the accommodating space 4.

The process of joining the first member 1 and the second member 2 by ultrasonic welding will now be explained, referring to FIGS. 2 to 4.

Figure 2:
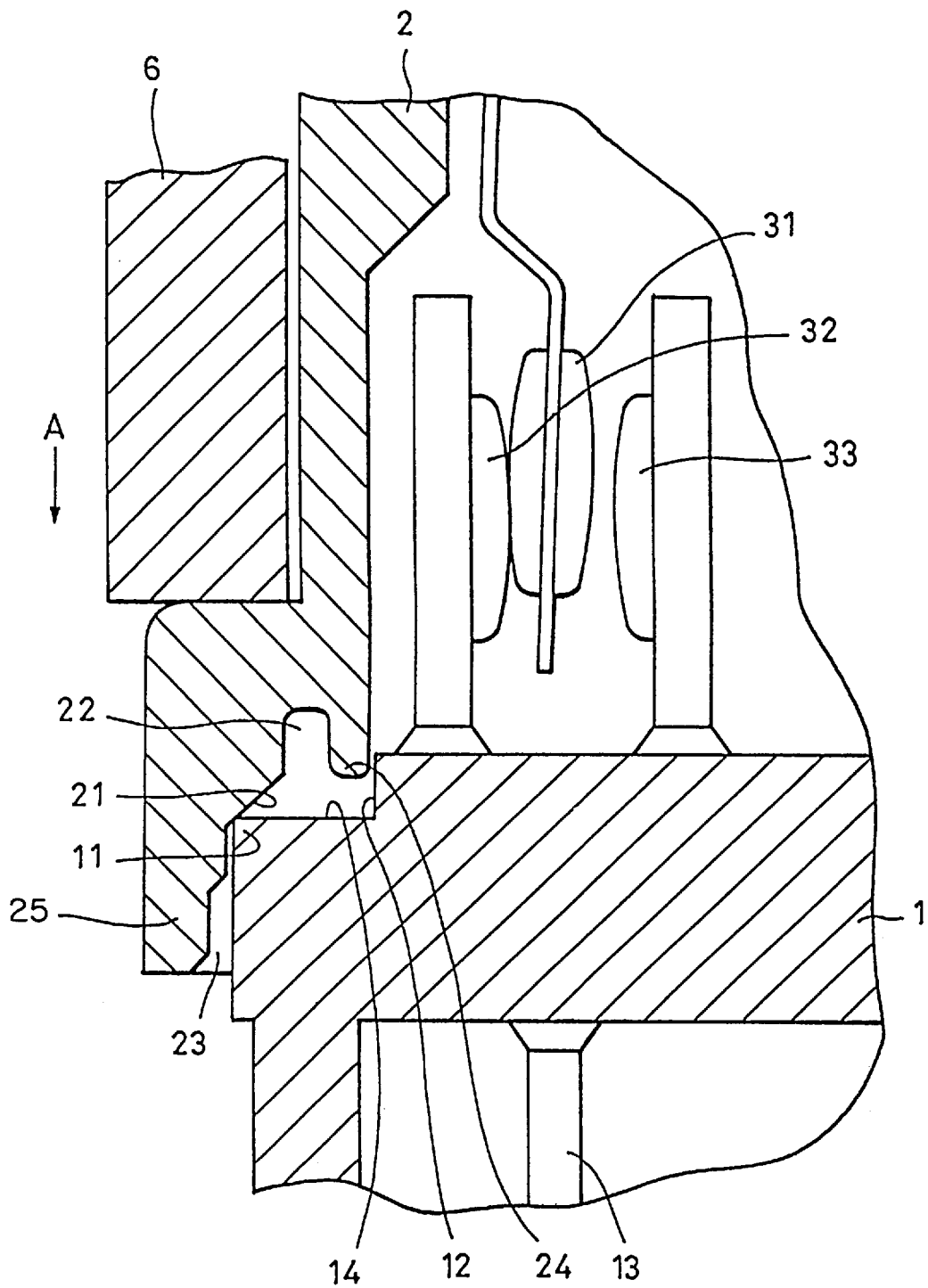
FIG. 2 is an enlarged diagram of a principal part of the case indicated in FIG. 1, showing an initial stage of an ultrasonic welding.

FIG. 2 shows the initial stage of the ultrasonic welding. As indicated in FIG. 2, the second member 2 is first put on the first member 1, and the horn 6 is laid on the second member 2.

Figure 3:
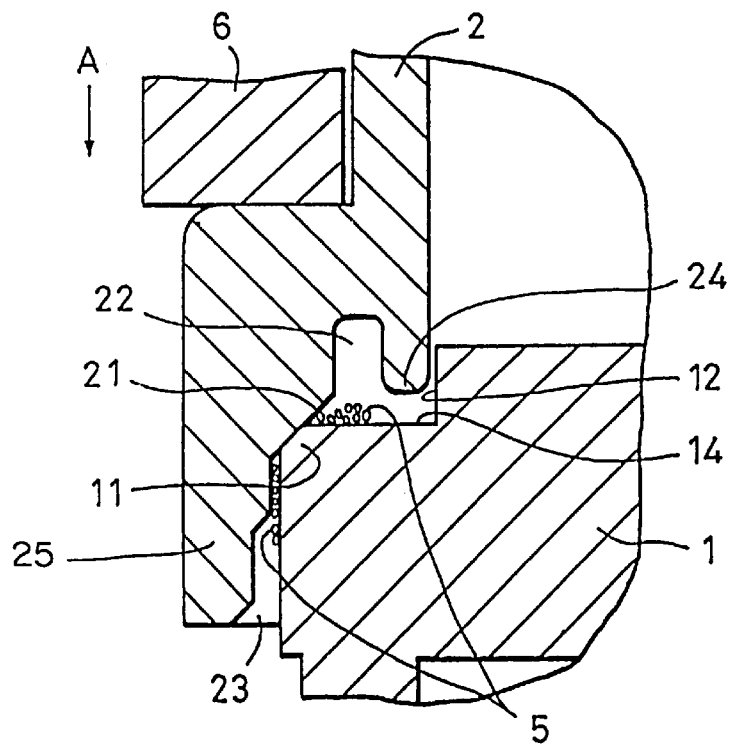
FIG. 3 is another enlarged diagram of a principal part of the case indicated in FIG. 1, showing an intermediate stage of the ultrasonic welding.

FIG. 3 shows the intermediate stage of the ultrasonic welding. As indicated in FIG. 3, an ultrasonic wave is applied to the horn 6 as the horn 6 is pressed in a direction indicated by an arrow A. The ultrasonic energy from the horn 6 is applied to the second member 2 so as to be concentrated where the joint portion 21 is brought into contact with the welding protrusion 11. In this manner, the joint portion 21 is heated to be welded to the welding protrusion 11. At this time, a molten synthetic resin, which does not contribute to the welding, is forced out on both sides of the joint portion 21 and forms welding refuse 5.

Figure 4:
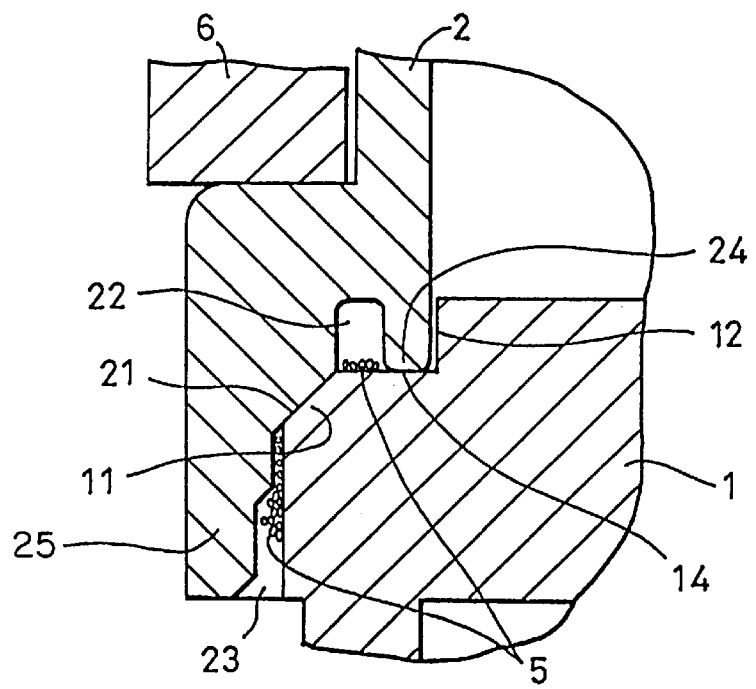
FIG. 4 is still another enlarged diagram of the principal part of the case indicated in FIG. 1, showing a final stage of the ultrasonic welding.

FIG. 4 shows the final stage of the ultrasonic welding. As indicated in FIG. 4, the lower end of the inner wall 24 of the second member 2 is in contact with a flat surface 14 of the first member 1. The ultrasonic welding between the two members 1 and 2 is terminated in this state. At this time, the welding refuse 5 is gathered in the groove 22 on the side of the accommodating space 4 and flows out through the opening 23 outside of the joint portion 21. Therefore, the welding refuse 5 does not penetrate into the interior of the accommodating space 4, and no welding refuse 5 is stuck to the contacts 31, 32 and 33 of the electric apparatus 3.

Although a relay is indicated as an example of the electric apparatus in the above embodiment, the techniques according to the present invention can be applied to other electric apparatuses having contacts. For example, they can be suitably used for watertight electric apparatuses, such as a so-called inhibitor switch, which detects a shift position in an automatic transmission for an automobile, a so-called throttle valve switch, which detects an aperture of a throttle valve, a so-called air flow meter, which detects an amount of air aspirated from an air cleaner, and so forth.

Since the present invention has the construction and the effect described above, no welding refuse produced by the ultrasonic welding process penetrates into the case accommodating an electric apparatus having contacts, such as a relay or the like. Therefore, no welding refuse is stuck to the contacts of the electric apparatus. For this reason it is possible to obtain an excellent effect in that no contact defect is produced by welding refuse on the contacts of the electric apparatus. It is also possible to further concentrate ultrasonic energy to the joint portion.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A structure for accommodating an electric apparatus, in which an accommodating space (4) for accommodating an electric apparatus (3) having contacts (31 32, 33) is constructed by a plurality of members (1, 2), and a joint portion (21) between the members (1, 2) is formed by ultrasonic welding, wherein a groove (22) for gathering welding refuse (5) produced by the ultrasonic welding is formed in and enclosed by one of said members (1, 2) separate from the joint portion (21) and extends along an inner circumference of said joint portion between said accommodating space (4) and said joint portion (21), said groove defining a cavity after said members are welded together for containing welding refuse; and wherein an opening (23) is disposed in one of said members (1, 2) between said members (1, 2) outside said joint portion (21), said opening (23) being wider with increasing distance from said joint portion.

2. The structure for accommodating an electric apparatus according to claim 1, wherein said plurality of members comprises a first member having a welding protrusion and a second member having a welding portion located opposite to said welding protrusion, said welding protrusion being ultrasonically welded to said welding portion to join said first and second members together to form said accommodating space, said groove being formed in said second member adjacent to said welding portion and extending along an inner circumference of said welding portion, said second member comprising an inner wall extending along an inner circumference of said groove between said groove and said accommodating space, said first member comprising a flat surface and a step extending along an inner circumference of said flat surface, said inner wall of said second member being in contact with said flat surface when said first and second members are welded together, said inner wall of said second member being located between said groove and said step to prevent welding refuse from penetrating into the accommodating space.

3. A casing for accommodating an electric apparatus, comprising:

a first member made of synthetic resin, said first member comprising a welding protrusion;

a second member made of synthetic resin, said second member comprising a joint portion and a flange portion;

said first and second members being secured together to form an accommodating space by ultrasonic welding said welding protrusion and said joint portion together; and a groove formed in and enclosed by one of said first and second members for gathering welding refuse, said groove being disposed between said accommodating space and said joint portion, said groove being separate from said joint portion and extending along an inner circumference of said joint portion, said groove defining a cavity after said members are secured together for containing welding refuse.

4. The casing for accommodating an electric apparatus according to claim 3, further comprising an opening to direct welding refuse from said joint portion, outside of said casing and away from said accommodating space.

5. The casing for accommodating an electric apparatus according to claim 4, wherein said opening becomes wider as a distance from said joint portion increases.

6. The casing for accommodating an electric apparatus according to claim 3, wherein said groove is formed in said second member.

7. The casing for accommodating an electric apparatus according to claim 6, wherein said second member further comprises an inner wall in engagement with a step portion of said first member, said groove being formed in said second member between said inner wall and said joint portion.

8. The casing for accommodating an electric apparatus according to claim 7, further comprising an opening through which welding refuse flows outwardly from said joint portion, said opening being defined by the flange portion of said second member, said flange portion being adjacent said joint portion.

9. The casing for accommodating an electric apparatus according to claim 8, wherein said opening becomes wider as a distance from said joint portion increases.

10. The casing for accommodating an electric apparatus according to claim 3, wherein said second member comprises an inner wall extending along an inner circumference of said groove between said groove and said accommodating space, said first member comprises a flat surface and a step extending along an inner circumference of said flat surface, said inner wall of said second member is in contact with said flat surface when said first and second members are welded together, and said inner wall of said second member is located between said groove and said step to prevent welding refuse from penetrating into the accommodating space.

* * * * *